United States Patent Office 3,437,879
Patented Apr. 8, 1969

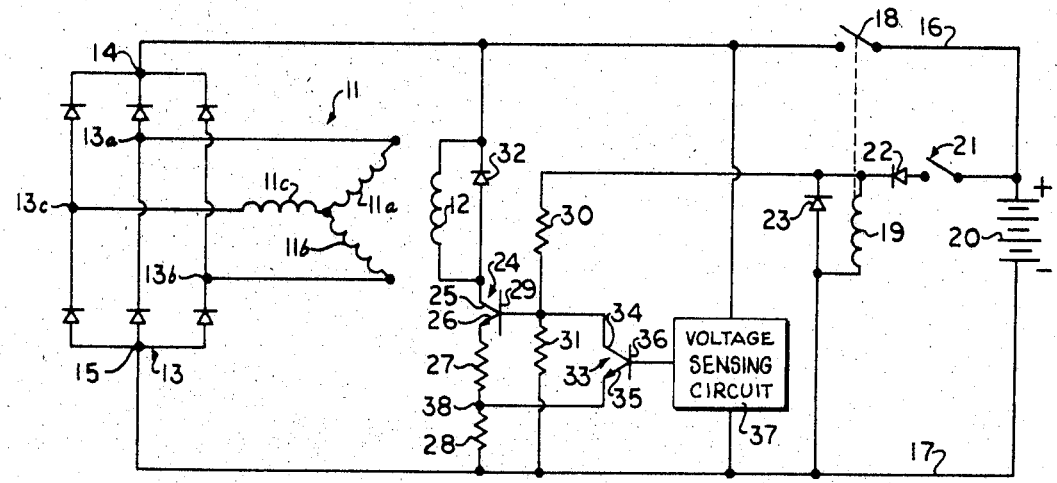

3,437,879
TRANSIENT PROTECTION FOR SEMI-CONDUCTOR DEVICE
Marion L. Snedeker, Cleveland, Ohio, assignor to The Leece-Neville Company, Cleveland, Ohio, a corporation of Ohio
Filed Dec. 19, 1966, Ser. No. 602,603
Int. Cl. H02h 1/04, 3/28
U.S. Cl. 317—31    12 Claims

ABSTRACT OF THE DISCLOSURE

In a regulator circuit for a vehicle alternator, a transistor which controls the energization of the alternator is protected from destructive electrical transients when a switch for the load relay is operated. When the switch is closed or opened, the voltage on the control electrode of the transistor changes immediately, but the inherent time delay in the closing or opening of the load relay contacts retards the voltage change at the output electrodes of the transistor.

---

This invention relates to a control arrangement for protecting a semiconductor device, such as a transistor, from potentially destructive electrical transients, particularly in a circuit for regulating the output from a voltage generating machine to a load which includes a battery.

Various regulator circuits have been proposed heretofore for controlling the energization of a voltage generating machine, such as an alternator, on a vehicle so as to regulate either the output voltage or current, or both, from the machine to a load which includes the vehicle battery. In many such regulator circuits the field winding of the voltage generating machine is connected in series with a transistor or other semiconductor device which conducts current as long as the output voltage, or the output current, or both, of the machine does not exceed a desired value. This transistor may have circuit connections through a switch to the vehicle battery so as to begin conducting current from the battery in response to closing of the switch, and to cease conducting current in response to opening of the switch. Either the closing or the opening of the switch may result in the application of destructive electrical transients to the transistor, and it is the primary purpose of the present invention to avoid this.

Accordingly, it is a principal object of the present invention to provide a novel and improved control arrangement for protecting a semiconductor device, such as a transistor, from destructive electrical transients when the semiconductor device is to be turned on or off.

Another object of this invention is to provide a novel and improved control arrangement for protecting a transistor from destructive electrical transients, when the transistor is to be turned on or off, by delaying the voltage change at the output electrodes of the transistor following the turn-on or turn-off voltage change at its control electrode.

Another object of this invention is to provide such a control arrangement for protecting a semiconductor device in a regulator circuit which controls the energization of a voltage generating machine, such as an alternator on a vehicle.

Another object of this invention is to provide such a control arrangement in which the semiconductor device is protected from transients by the inherent time delay in the closing or opening of the contacts of a load relay connected between the output of the generating machine and a load which includes a battery.

Further objects and advantages of the present invention will be apparent from the following detailed description of a presently preferred embodiment thereof, which is illustrated schematically in the single figure of the accompanying drawing.

Referring to the drawing, the voltage generating machine is an alternator of known design having a three-phase armature winding 11 on the stator and a field winding 12 on the rotor. The different phase windings of the armature are designated by the reference numerals 11a, 11b and 11c, respectively. These phase windings are connected to the respective input terminals 13a, 13b and 13c of a full-wave rectifier 13 having positive and negative output terminals 14 and 15. The negative output terminal 15 is connected to a negative load conductor 17, which may be grounded. The positive output terminal 14 is connected to a positive load conductor 16 through the normally-open contacts 18 of a load relay having an electrically energizable operating coil 19. The load which is to be energized by the alternator includes a storage battery 20 connected across the load conductors 16 and 17. The alternator and the battery may be on a vehicle, such as an automobile.

A control switch 21, which may be connected to the ignition switch on the vehicle, is connected between the positive terminal of battery 20 and the upper end of the relay coil 19 through a semiconductor rectifier diode 22. The lower end of the relay coil 19 is connected to the negative load conductor 17. When the battery 20 is connected across the load conductors 16 and 17 with the proper polarity, as shown, the closing of switch 21 will cause battery current to flow through rectifier 22 and the load relay coil 19. This energization of the load relay coil will cause it to close the relay contacts 18 after a time delay which is inherent in the operation of the relay. A semiconductor rectifier diode 23 of the polarity indicated is connected across the relay coil 19 to provide a short-circuit for current produced by the collapse of flux when coil 19 is deenergized.

A control transistor 24 is connected to the field winding 12 of the alternator to control the latter's energization. As shown in the drawing, the upper end of the alternator field winding 12 is connected directly to the positive output terminal 14 of rectifier 13. The lower end of the field winding 12 is connected directly to the collector electrode 25 of transistor 24. The emitter electrode 26 of transistor 24 is shown connected through a pair of series-connected resistors 27 and 28 to the negative output terminal of rectifier 13. Either resistor 27 alone may be omitted, or both resistors 27 and 28 may be omitted, if desired. The base electrode 29 of control transistor 24 is connected through a resistor 30 to the upper end of the relay coil 19. A bias resistor 31 is connected between the base electrode 29 and the negative output terminal 15 of the alternator-rectifier 11, 12, 13. A semiconductor rectifier diode 32 is connected across the field winding 12 of the alternator with the polarity shown to provide a short-circuit for current produced by the flux collapse when winding 12 is deenergized.

A driver transistor 33 has its collector electrode 34 connected directly to the base 29 of transistor 24 and has its emitter electrode 35 connected directly to the juncture 38 between resistors 27 and 28. If resistor 27 is omitted, as already suggested, the emitter electrode 35 of the driver transistor 33 will be connected directly to the emitter electrode 26 of the control transistor 24. The base electrode 36 of the driver transistor 33 is connected to a voltage sensing circuit 37 of known design, which is connected across the output terminals 14, 15 of the alternator-rectifier 11, 12, 13 to sense the latter's output voltage.

The volage sensing circuit 37, driver transistor 33 and control transistor 24 together constitute a voltage regulator of known design for regulating the output voltage of the alternator-rectifier. With switch 21 closed and the load relay contacts closed, the operation of this voltage regulator is as follows:

If the output voltage across the output terminals 14, 15 of the alternator-rectifier 11, 12, 13 is below a predetermined value, the voltage at the base electrode 36 of the driver transistor 33 will be too low to turn on this transistor. Under these conditions, the control transistor 24 will conduct current and, since its output electrodes 25 and 26 are in series with the field winding 12, the field winding will be conducting current to energize the alternator.

However, when the output voltage of the alternator-rectifier 11–13 has risen to the aforementioned predetermined value, the voltage at the base 36 of the driver transistor 33 will turn transistor 33 on. The current flow through the collector-emitter path 34, 35 of the driver transistor will cause the voltage at the base 29 of the control transistor 24 to drop to a value which will turn off the current flow through the collector-emitter path 25, 26 of transistor 24. Therefore, the current through the field winding 12 of the alternator will cease until the driver transistor 33 is turned off, and this does not happen until the output voltage of the alternator-rectifier has dropped to a value such that the potential at is base elecrode 36 will be at the turn-off level.

In accordance with the present invention, the control transistor 24 in this voltage regulator is protected against electrical transients which may be of destructive magnitude when the switch 21 is closed or opened, in the following manner:

Assuming that initially the switch 21 is open, the relay coil 19 is deenergized and consequently the relay contacts 18 are open, if now the user closes the switch 21, the battery 20 will be immediately connected to the base 29 of the control transistor 24 to apply a turn-on voltage to the latter through rectifier 22 and resistor 30. However, the load relay has an inherent time delay in the closing of its contacts 18, so that the battery will not be connected immediately to the collector-emitter path of transistor 24. During the time interval between the closing of switch 21 and the later closing of the load relay contacts 18, any electrical transients which occur as a result of the closing of switch 21 are not applied to the collector-emitter circuit of transistor 24. These transients will disappear or diminish to a negligible value by the time that the load relay contacts 18 close to permit battery current to flow through the field winding 12 and the collector-emitter circuit of transistor 24.

Similarly, whenever the switch 21 is opened by the user, the load relay has an inherent time delay in the opening of its contacts 18, and this delay insures that any possible destructive electrical transients caused by the opening of switch 21 are not applied to the collector-emitter circuit of transistor 24. Instead, the opening of switch 21 immediately removes the positive potential on the base electrode 29 of transistor 24 to turn off this transistor and only after the time delay in the opening of the relay contacts 18 is the connection from the battery 20 to the collector-emitter circuit of transistor 24 broken.

It will be apparent that the present transient protection arrangement does not alter or interfere with the usual operation of the voltage regulator under safety-state conditions, i.e., while switch 21 and the relay contacts 18 are closed. Accordingly, therefore, the particular illustrated embodiment of the present invention may be embodied in a voltage regulator of proven reliability without affecting the latter's essential operating characteristics, except to provide protection of the control transistor from electrical transients.

While a specific presently-preferred embodiment of this invention has been described in detail and shown in connection with a known type of regulator for a vehicle alternator, it is to be understood that the present transient protection arrangement may be used in other circuits and may differ in various particulars from the specific arrangement disclosed without departing from the scope of this invention.

Having described my invention, I claim:

1. In combination with a semiconductor device having a control electrode and having output electrodes for providing a current path for a power source, switch means for connection to said power source, electrically energizable control means connected to said switch means to be energized from said power source when said switch means is closed, means connecting said control electrode to said switch means to apply to said control electrode a turn-on signal from said power source substantially immediately when said switch means is closed, and normally-open circiut means for connection between said power source and one of said output electrodes of said semiconductor device, said normally-open circuit means being operable by said control means to close the circuit between said power source and said one output electrode after a time delay interval following the closing of said switch means and the turn-on signal to said control electrode to protect said semiconductor device from electrical transients occurring during said interval.

2. The combination of claim 1, wherein said normally-open circuit means has a time delay in opening following the deenergization of said electrically energizable control means by the opening of said switch means.

3. The combination of claim 1, wherein said electrically energizable control means comprises a relay coil, and said normally-open circuit means comprises relay contacts operable by said relay coil.

4. In combination with a semiconductor device having a control electrode and having output electrodes for providing a current path for a power source, a switch for connection to said power source, a relay having electrically energizable coil means connected to said switch to be energized from said power source when said switch is closed, and circuit means connecting said switch to said control electrode to apply to the latter a turn-on signal from said power source substantially immediately when the switch is closed, said relay having normally-open contacts for connection in said current path between said power source and one of said output electrodes of said semiconductor device, said current path being separate from the energization circuit for said coil means through said switch, said relay having a time delay interval in the closing of its contacts after said switch is closed and said turn-on signal is applied to the control electrode so as to delay the connection of said power source to said one output electrode to protect said semiconductor device from electrical transients occurring during said interval.

5. The combination of claim 4, wherein said relay has a time delay in the opening of its contacts following the opening of said switch.

6. The combination of claim 5, wherein said semiconductor device is a transistor.

7. An electrical generating system comprising a voltage generating machine having a unidirectional output for connection to a load which includes a battery, said machine having an electrically energizable field winding, a semiconductor device having a control electrode and having output electrodes connected in series with said field winding across the output of said machine, a load relay having normally-open contacts connected between the output of said machine and said load, said relay having an operating coil for controlling said contacts, and switch means having one side thereof connected to said control electrode and to said operating coil, said switch means having the opposite side thereof for connection to said battery so as to apply a turn-on signal to said control electrode and to complete an energization circuit for said operating coil from the battery when said switch means is closed, said load relay having a time delay interval in the closing of its contacts following the closing of said switch means so as to delay the connection of said field winding and said output electrodes of said semiconductor device across the battery, whereby to protect said semiconductor device from destructive electrical transients occurring during said interval following the closing of said switch means.

8. An electrical generating system according to claim 7, wherein said load relay has a time delay in the opening of its contacts following the opening of said switch means.

9. An electrical generating system according to claim 8, wherein said semiconductor device is a transistor, and said output electrodes are the collector and the emitter of the transistor.

10. In a regular circut for a voltage generating machine having a field winding and having a unidirectional output for connection to a load which includes a battery, said regulator circuit including a semiconductor device having a control electrode and having output electrodes for connection in series with said field winding across the output of said machine, means responsive to the electrical output of said machine and coupled to said control electrode of said semiconductor device for controlling the field winding current flow through the latter's output electrodes, and a load relay having normally-open contacts for connection between the output of said machine and said load and having an operating coil controlling said contacts, the improvement which comprises:

a switch for connection between the battery and said operating coil of the relay to energize the latter with battery current in response to closing of the switch; and circuit means connecting said switch to said control electrode of the semiconductor device to apply a turn-on signal to the latter in response to closing of the switch;

said load relay having a time delay in the closing of its contacts following the closing of said switch so as to delay the connection of the battery to said field winding of the machine and said output electrodes of the semiconductor de-device.

11. A regulator circuit according to claim 10, wherein said load relay has a time delay in the opening of its contacts following the opening of said switch.

12. A regulator circuit according to claim 11, wherein said semiconductor device is a transistor, and said output electrodes are the collector and emitter of the transistor.

References Cited

UNITED STATES PATENTS

| | | | |
|---|---|---|---|
| 3,098,966 | 7/1963 | Raver | 322—28 X |
| 3,144,591 | 8/1964 | Levinson | 317—142 |
| 3,210,645 | 10/1965 | Domann | 322—28 |
| 3,363,167 | 1/1968 | Szabo et al. | 322—28 X |

JOHN F. COUCH, *Primary Examiner.*

J. D. TRAMMELL, *Assistant Examiner.*

U.S. Cl. X.R.

317—33, 36, 49; 320—64; 322—28